(No Model.)
G. E. BROYLES.
VEHICLE WHEEL.
No. 384,189. Patented June 5, 1888.
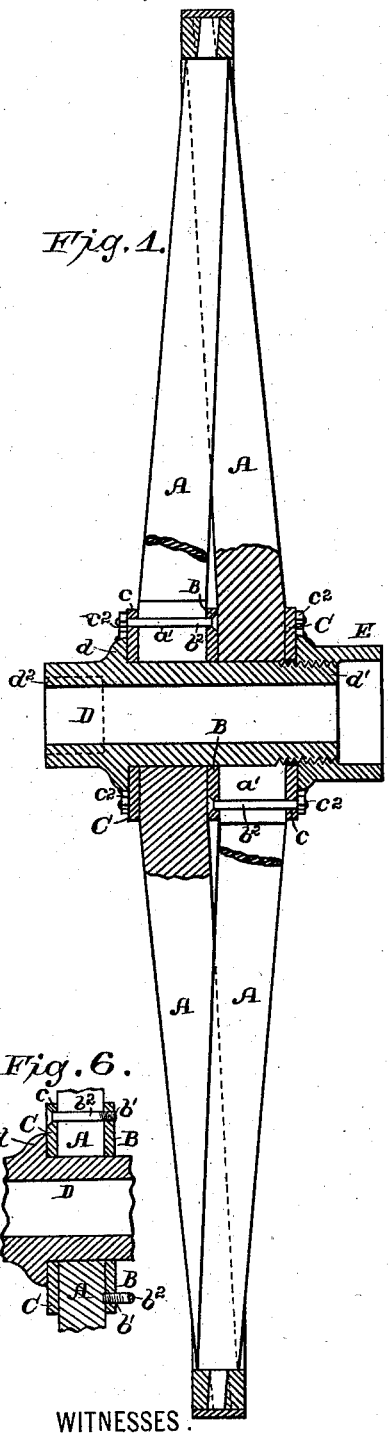
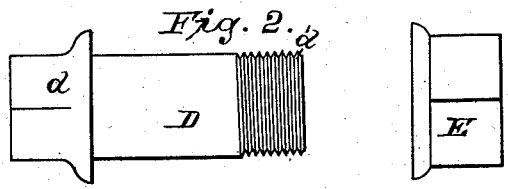
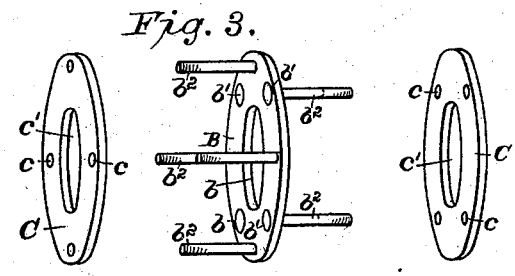
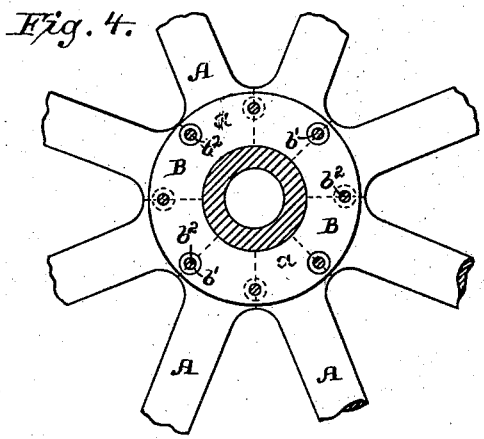
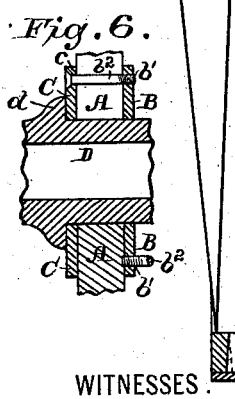
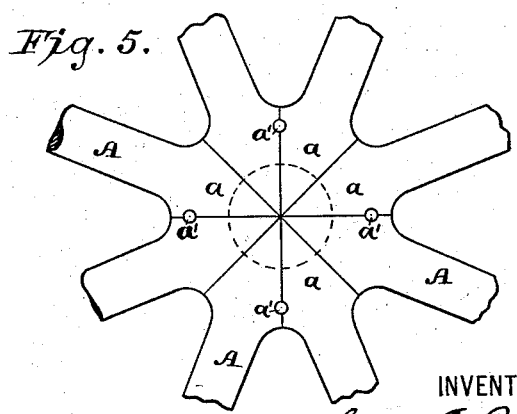
WITNESSES:
E. A. Newman,
C. M. Newman,
INVENTOR.
George E. Broyles.
By his Attorneys
Baldwin Hopkins & Peyton

UNITED STATES PATENT OFFICE.

GEORGE E. BROYLES, OF RINGGOLD, GEORGIA, ASSIGNOR OF TWO-THIRDS TO CHARLES W. GRAY AND FRED A. VAUGHAN, BOTH OF SAME PLACE.

VEHICLE-WHEEL.

SPECIFICATION forming part of Letters Patent No. 384,189, dated June 5, 1888.

Application filed August 31, 1887. Serial No. 248,385. (No model.)

*To all whom it may concern:*

Be it known that I, GEORGE E. BROYLES, a citizen of the United States, residing at Ringgold, Catoosa county, Georgia, have invented certain new and useful Improvements in Vehicle-Wheels, of which the following is a specification.

The object of my invention is to provide a strong, light, durable, and inexpensive wheel that may be readily made and repaired.

My invention relates more particularly to the hub part of the wheel; and it consists in joining the inner ends of the spokes in an improved way.

In the accompanying drawings, Figure 1 is a vertical central section of my wheel; Fig. 2, a view of the axle-box; Fig. 3, a view of the washers and securing-bolts; Fig. 4, a front view of the central part of the wheel. Fig. 5 shows the manner of joining the spokes, and Fig. 6 shows a modification.

I employ two sets of spokes, as shown in the accompanying drawings, and construct the wheel by first forming the spokes A with triangular inner ends, $a$, and giving them a slight bevel or inclination, as shown in Fig. 1, to provide for the proper dish or inclination. The inner ends of the spokes are brought together, as indicated in Fig. 5, and are bored at $a'$ to form bolt-holes—not centrally, as that would weaken the spokes, but on the edges, one half of the aperture being in one spoke and the other half in a contiguous spoke. A second set of spokes is constructed and arranged in a similar manner. Each set of spokes has the bolt-holes between each alternate joint. Thus where there are eight spokes in each set, as shown in the drawings, there are four bolt-holes, and when the spokes are set up the bolt-holes in one set are arranged between those in the opposite set. A washer, B, is placed between the two sets of spokes, and is secured thereto, as will now be described.

The washer B has a central aperture, $b$, to accommodate the axle-box, and is provided with two sets of bolt-holes, $b'$, to receive bolts $b^2$, that project alternately in opposite directions from the washer, as shown in Fig. 3. The bolts are removable from the washer, and their heads are countersunk in the washer, as shown in Figs. 1 and 3. The bolts are passed through the apertures or bolt-holes $a'$ in the spokes, the bolts projecting in one direction through one set of spokes and those projecting in the opposite direction through the other set. The outer ends of the bolts, which are screw-threaded, extend through apertures or bolt-holes $c$ in the outside washers, C, on each side of the spokes. The washers are perforated centrally at $c'$ to receive the axle-box. Nuts $c^2$ are screwed home on the bolts and serve to firmly secure together the three washers and the two sets of spokes. The fellies and tire are then secured in any suitable way to the outer ends of the spokes. The spokes are then bored centrally coincidently with the apertures in the washers to receive the axle-box D, which is next placed in position. The box consists, preferably, of a hollow cylinder having a flanged head, $d$, and a screw-threaded end, $d'$. The flanged head bears against one outside washer, and a nut, E, is screwed home on the end of the box, so as to bear against the opposite washer. This completes the wheel. The nut E preferably extends beyond the outer end of the axle-box to form a nose-band for the axle, and the head of the box may be provided with a recess, $d^2$, (shown by dotted lines,) to accommodate the collar usually formed on the outer end of the axle-spindle.

The metallic parts of the wheel may be made of any suitable metal; but I prefer to make the washers of wrought-iron. The width of the washer may be made of any desired thickness. The greater the thickness of the washer the greater the dish or inclination of the spokes, and vice versa.

In Fig. 6 I have shown a slight modification. Here the central washer is provided with screw-threaded bolt-holes, and the bolts are inserted first through the outside washers, then through the spokes, and then screwed into the inside washers. The bolt-holes in the outside washers are countersunk to receive the heads of the bolts. This arrangement is especially designed for fine wheels—such as carriage and buggy wheels—where a fine finish is desired.

The wheel may be set up in other ways from that above described—i. e., the several parts may be put together in a different order; but I prefer the mode indicated.

It will be seen that should one or more spokes break they may be removed and replaced without removing the tire and without disturbing the other spokes.

I claim as my invention—

1. The combination, substantially as hereinbefore set forth, of the two sets of spokes, a single central washer, the outside washers, the bolts for securing the outside washers to the central washer and for clamping the spokes thereto, and the axle-box that extends through the washers, having a head formed on one end that bears against one of the washers and screw-threaded at the opposite end to receive a nut that bears upon the other outside washer.

2. The combination, substantially as hereinbefore set forth, of the two sets of spokes, the central washer, the outside washers, a set of bolts for securing together the central washer, one set of spokes, and an outside washer, and a separate set of bolts for securing together the central washer, the other set of spokes, and the other outside washer.

3. The combination, substantially as hereinbefore set forth, of the two sets of spokes, each set having their ends brought together to form the center of the wheel, a washer between the two sets of spokes, a washer on the outer side of each set of spokes, bolts extending in opposite directions from the central washer through the outside washers and through the edges of the spokes, the securing-nuts on the bolts, and the axle-box secured to the spokes and washers.

In testimony whereof I have hereunto subscribed my name.

GEORGE E. BROYLES.

Witnesses:
SIMEON PENDLETON,
R. M. MORRIS.